United States Patent [19]

Schmidt et al.

[11] 4,449,211

[45] May 15, 1984

[54] LOW DRAG BODY CONFORMAL ACOUSTIC ARRAY

[75] Inventors: Richard L. Schmidt; Edmund J. Sullivan, both of Portsmouth; Bernard J. Myers, Bristol, all of R.I.; Edward G. Liszka, Bethesda, Md.

[73] Assignee: The United States of America as represented by the Secretary of the Navy, Washington, D.C.

[21] Appl. No.: 395,388

[22] Filed: Jul. 6, 1982

[51] Int. Cl.³ .......... H04B 13/00

[52] U.S. Cl. .......... 367/153; 367/149; 367/171; 367/172; 114/20 R

[58] Field of Search .......... 367/153, 154, 156, 157, 367/160, 161, 163, 165, 166, 167, 171, 172, 173, 174; 114/20 R, 21 R

[56] References Cited

U.S. PATENT DOCUMENTS

| | | | |
|---|---|---|---|
| 2,490,595 | 12/1949 | Mertin | 367/172 |
| 2,517,975 | 8/1950 | Chapin | 367/161 X |
| 3,059,217 | 10/1962 | Boswell | 367/173 |
| 3,145,679 | 8/1964 | Brooks | 367/153 X |
| 3,884,170 | 5/1975 | Jensen | 114/20 R |
| 3,907,062 | 9/1975 | Brigham et al. | 367/153 |
| 4,158,189 | 6/1979 | Wardle | 367/153 |
| 4,268,912 | 5/1981 | Congdon | 367/174 |

*Primary Examiner*—Harold J. Tudor

*Assistant Examiner*—Tyrone Davis

*Attorney, Agent, or Firm*—Robert F. Beers; Arthur A. McGill; Michael J. McGowan

[57] ABSTRACT

A plurality of transducers, closely conforming to the surface of a low-drag nose, are baffle mounted in close pack configurations to eliminate grating lobes. The baffle assembly is mounted outside a pressure hull within a thin acoustically transparent fairing. A plurality of pressure compensators also attach outside the pressure hull. The cavity between pressure hull and fairing is filled with pressure compensating acoustic fluid. Larger portions of unused volume are first filled with a syntactic foam to minimize the amount of fluid required. The pressure compensators balance fluid pressure against external sea pressure to prevent fairing collapse. This array maximizes available nearby internal nose volume thus allowing beamforming electronics to be located within the pressure hull in close proximity to the array elements, connecting thereto via a plurality of short coaxial cables. The increased surface area of a conformal array permits use of a greater number of transducers resulting in wide aperture and a narrower beamwidth than is possible with a planar array. This array has the capability of steering a beam forward backward and to the side with little variation in beam sensitivity, and when scanning forward along the torpedo axis, projects a larger aperture forward than planar configurations.

9 Claims, 5 Drawing Figures

LOW DRAG BODY CONFORMAL ACOUSTIC ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to nonplanar acoustic arrays and more particularly to an acoustic array which conforms closely to the curved laminar flow surface of a low drag underwater shape thereby maximizing available nearby internal nose volume while providing new capabilities and improved array performance.

(2) Description of the Prior Art

Present torpedo acoustic arrays are generally planar. Planar arrays however present many problems which place undue restrictions on torpedo diameter, nose shape, volume utilization, and array capability and performance. This is especially true where the torpedo nose must present a low drag laminar flow shape. A standard forward-looking planar array should be as large in diameter as the torpedo diameter will allow in order to provide maximum array gain. Unfortunately, for a curved, low drag nose this means the array must be positioned far away from the tip of the nose resulting in a large wasted forward volume. Also a forward-looking array is not very efficient when looking at angles far from the straight ahead boresight axis. In order to solve these problems, an array comprising two generally side-looking planar arrays has been constructed (see co-pending U.S. Navy patent application Ser. No. 237,549) where the planar array faces are generally parallel to the curved torpedo nose. This approach, while providing an improvement over the forward-looking array, does not solve the problem of maximizing useful available internal volume. In addition the side-looking planar array requires the use of thick acoustic windows in the pressure hull which produce undesirable refractive effects. Also, although the number of array elements has been increased with the side-looking planar array, the limitation of array elements to a planar surface places an overly restrictive bound on potential array aperture especially side-to-side aperture. The instant invention avoids these problems by providing an array that closely conforms to the nonplanar surface of the nose of a low drag torpedo.

SUMMARY OF THE INVENTION

Accordingly, it is a general purpose and object of the present invention to provide an array which closely conforms to the curved surface of a low drag torpedo nose. It is a further object to maximize available internal torpedo nose volume. Another object is to reduce grating lobes. A still further object is to provide an array with the largest possible aperture commensurate with torpedo length, diameter and shape.

These objects are accomplished with the present invention by providing a low-drag torpedo, conformal acoustic array comprising a plurality of acoustic transducer elements arranged so as to conform to the curved, laminar flow surface of a low-drag torpedo nose. The array is mounted on a baffle, arranged in close packed configuration to eliminate grating lobes and the combined assembly is then mounted within a fluid filled, thin acoustically transparent fairing located outside the torpedo nose pressure hull. Pressure compensators are also mounted on the pressure hull. Unused external volume is filled with a lightweight syntactic foam prior to fluid fill to minimize the amount of compensating acoustic fluid required. The pressure compensators adjust fairing fluid pressure so as to balance against external sea pressure thus preventing fairing collapse. Conforming of the array to the outer surface shape maximizes nearby available internal nose volume thus allowing beamforming electronics to be located within the thicker pressure hull cavity in close proximity to the array elments and to connect thereto via a plurality of short coaxial cables. The increased surface area of the conformal array versus a planar array, permits use of the greatest possible number of array elements for a given nose shape resulting in a wide aperture and hence a narrower beamwidth than is possible with a strictly planar array. This novel array has the capability of steering the acoustic beam forward, backward and to the side with little variation in beam sensitivity, and when scanning forward along the torpedo axis this array projects a larger forward aperture than any planar configuration due to the streamlined hydrodynamic nose shape and the increased number of array elements.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
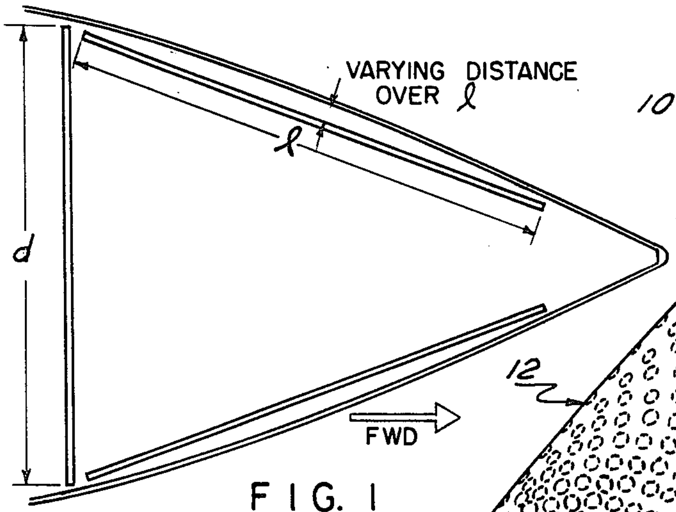
FIG. 1 shows the relative orientation of typical forward-looking and side-looking planar arrays.

Planar forward-looking torpedo acoustic arrays as shown in FIG. 1 are generally limited in aperture, D, by the diameter, d, which is the diameter available in the nose of the torpedo for a forward-looking planar array. This limitation results in low gain for the array due to attendant relatively broad beamwidths (BW). Beamwidth may be approximated by the expression:

$$BW = \frac{60^\circ \lambda}{D} \text{ (degrees)}$$

where λ=wavelength=c/f, f is the operating frequency desired and c is the velocity of sound in seawater. It should be noted that D and λ have the same units. Substituting and rearranging terms it can be shown that $$BW = 60^\circ \times \frac{c}{Df}$$

As can be seen, for a constant sound speed c, narrower beamwidth can be achieved by increasing frequency f which reduces the wavelength. High frequency shorter wavelength beams however travel reduced distances due to higher attenuation thus reducing array efficiency. It is best to increase aperture D. This may be accomplished by increasing the number of transducer elements in the array thereby increasing the spatial extent of the array. One way to do this is to increase torpedo diameter d while holding λ constant. Increases in torpedo diameter however are not always desirable or even possible. Another approach for increasing D is to construct a side-looking planar array having length l thereby increasing the quantity of transducer elements and hence D. This approach however has the drawback of producing a varying distance over l between the side-looking planar array surface and the curved outer nose fairing associated with many laminar flow shapes. It should be noted that the total set-off distance between the side-looking array and the fairing is actually greater than shown due to out of plane curvature of the fairing. To compensate for set-off and curvature, thick acoustic windows are required which then produce undesirable refractive effects. The present invention produces an array which closely conforms to the curved outer fairing of the torpedo nose thereby maximizing array aperture D for a given torpedo nose diameter and shape.

Figure 2:
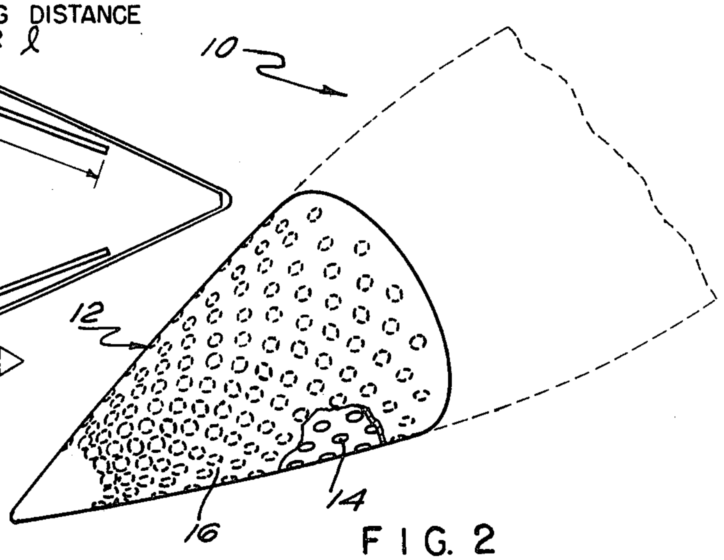
FIG. 2 shows a laminar flow vehicle with a low drag conical nose having a conformal array disposed thereabout.

Referring now to FIG. 2 there is shown a forward portion of a laminar flow torpedo vehicle 10 having a generally conical, low drag nose 12. A plurality of closely packed hydrophones 14, disposed about the surface of conical nose 12, are located just within and closely following the contour of outer fairing 16. Such a conformal array utilizes the full aperture capability of such a conical nose. While a conical nose has been described it must be realized that any other low drag, curved surface type nose, e.g., parabaloid, elliptical, ogive, etc., can also be used without deviating from the teachings of this invention.

Figure 3:
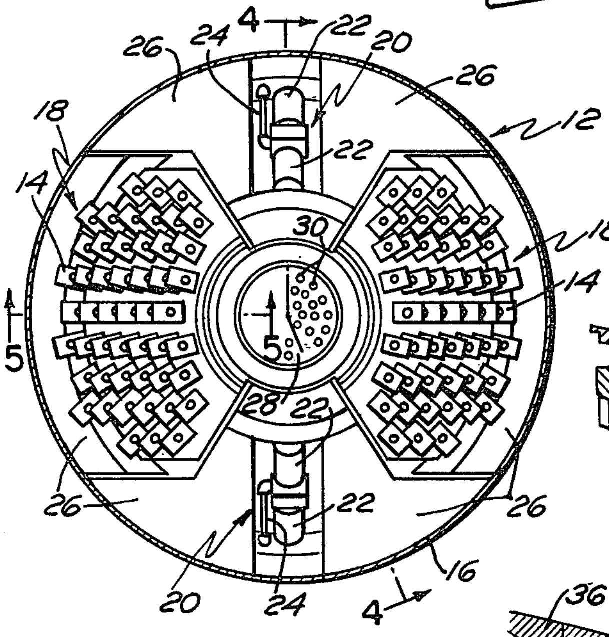
FIG. 3 shows a front view of the vehicle nose of FIG. 2 with the outer fairing removed.

Referring now to FIG. 3 there is shown a front view of nose 12 with thin, acoustically transparent outer fairing 16 removed. Fairing 16 may be constructed of aluminum or any other suitable metal. A plurality of hydrophones 14 are arranged in close packed array configurations 18 occupying preselected conical area segments of nose 12. A plurality of pressure compensators 20 are affixed in areas of nose 12 not occupied by array configurations 18. These pressure compensators each further include a pair of rubber bladders 22 which connect by means of pressure lines 24 to ambient sea pressure to adjust the internal pressure within outer fairing 16 to that of the external sea pressure in order to prevent fairing collapse. The remaining segmental areas of conical nose 12 not occupied by array configurations 18 or pressure compensators 20 are filled with syntactic foam pieces 26. The forward nose area also provides in the forward end thereof a coaxial connector 28 which further includes a plurality of connecting pins 30. The number of hydrophones 14 and the spread angle of each array configuration 18 are preselected to cover the percent of nose area desired. Once the hydrophone array configurations 18 are installed the selected number of pressure compensators 20 are positioned and affixed, and then the remaining volume is occupied by a plurality of precut foam pieces 26.

Figure 4:
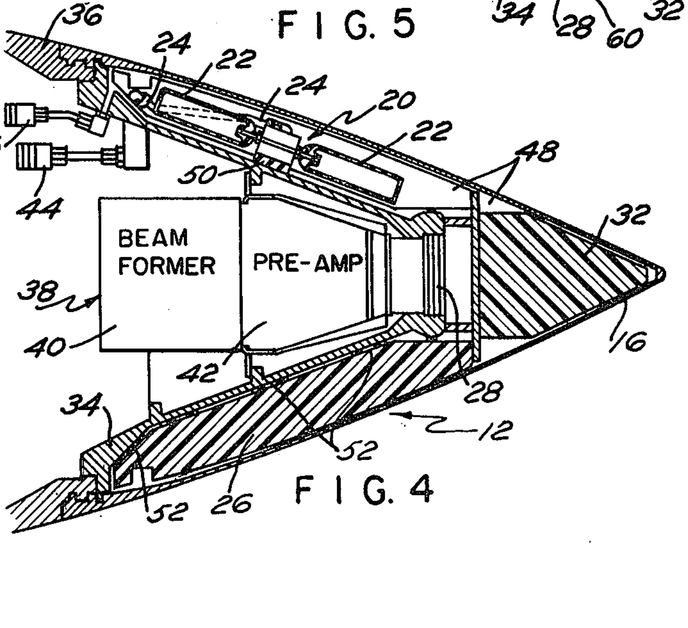
FIG. 4 is a sectional view taken along line 4—4 of FIG. 3.

FIG. 4 shows a sectional side view of nose 12 taken along line 4—4 of FIG. 3. Thin outer fairing 16 is shown in the as assembled position and an additional foam noise filler piece 32 is shown affixed forward of coaxial connector 28. Nose 12 is an assembly which uses as a foundation conical truncated pressure hull 34 which in turn attaches to vehicles 10's midbody 36. Within the interior cavity of pressure hull 34 and directly attached to coaxial connector 28 is a beamformer electronic package 38 further comprising beamformer 40 and preamplifier 42 being thus located in close proximity to array configurations 18. Pressure line 44 connects to pressure compensator 20 through pressure hull 34 and pressure line 24. The other end of pressure line 44 connects internally through vehicle 10 to a point on the after torpedo surface where it is directly exposed to sea pressure. External sea pressure is transmitted through line 44 and lines 24 to bladders 22 for each pressure compensator 20 to provide a balancing force within fairing 16. All remaining voids within fairing 16 but outside pressure hull 34 are filled through connecting pipe 46 with a lightweight acoustic fluid, such as castor oil 48, having substantially the same sound velocity transmission characteristics as seawater. Oil 48 is pressurized by the expansion of bladders 22 caused by external sea pressure thus exerting an internal pressure on fairing 16 equal to the external sea pressure. Each of the plurality of pressure compensators 20 is connected to pressure line 44. The present embodiment describes a conical pressure hull surrounded by a conical fairing; however, other fairing shapes such as ogive, parabola, etc. may also be used provided that the pressure hull follows the same contour as the fairing thereby assuring a uniform distance from each hydrophone to the fairing. Pressure compensators 20 are each mounted on vibration isolators 50 which absorb any vibrations from internal torpedo source which would otherwise transmit through the pressure hull. Foam pieces 26 are also mounted on a plurality of vibration isolation pads 52.

Figure 5:
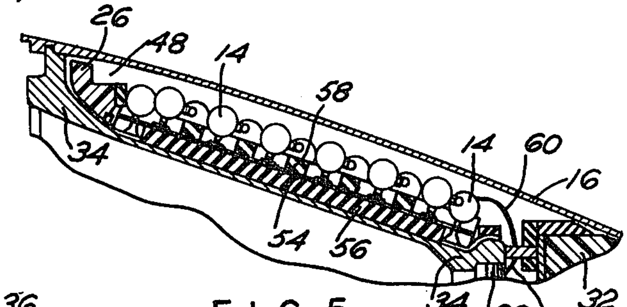
FIG. 5 is a partial sectional view taken along line 5—5 of FIG. 3.

Referring now to FIG. 5 there is shown a partial cross sectional view of an array configuration 18 which further includes a plurality of small, lightweight omnidirectional hydrophones 14 of the double flexural disc type. These hydrophones are arranged in close packed configuration 18 being spaced generally in a hexagonal pattern at such a distance from each other based on $<\frac{1}{2}\lambda$ spacing so as to eliminate grating lobes for all sweep angles over a broad forward to aft and side to side range. Each hydrophone is affixed to a baffle assembly which comprises metal mounting plate 54 having the same curvature as the pressure hull. On the underside of plate 54 is bonded a layer of air filled vibration isolation material 56, preselected for projected operating depth. The top side of plate 54 has another layer of the same vibration isolation material 58 bonded thereto, which layer has a pattern of holes cut therein such that layer 58 exposes the mounting locations for each of hydrophones 14. Each baffle assembly is attached to pressure hull 34. Each hydrophone is connected to coaxial connector 28 by a coaxial cable such as 60. Compensating fluid then fills all remaining voids between pressure hull 34 and outer fairing 16 not occupied by foam pieces 26 or pressure compensators 20.

Advantages of the conformal array over the prior art planar arrays are as follows: (a) It does not consume as much useful volume of the torpedo nose as a forward or a side-looking planar array configuration would. (b) It avoids the need for the thick acoustic windows that planar side-looking or planar forward-looking arrays require with their concommitant refractive problems. (c) It allows for narrower beams than the standard forward-looking array due to the greater aperture. (d) It has a side-looking capability that a forward-looking array lacks, while still maintaining an efficient forward-looking capability. (e) It permits the sonar to have high gains and narrow beams over a greater range of steering angles than either the forward-looking or side-looking planar array. (f) It permits arrays to be configured that conform to practically any surface contour—an advantage when considering new low-drag streamlined hydrodynamic shapes.

What has thus been described is a low-drag torpedo, conformal acoustic array comprising a plurality of acoustic transducer elements arranged so as to conform to the curved, laminar flow surface of a low-drag torpedo nose. The array is mounted on a baffle, arranged in a close packed configuration to eliminate grating lobes and the combined assembly is then mounted within a fluid filled, thin acoustically transparent fairing located outside the torpedo nose pressure hull. Pressure compensators are also mounted on the pressure hull. Unused external volume is filled with a lightweight syntactic foam prior to fluid fill to minimize the amount of compensating acoustic fluid required. The pressure compensators adjust fairing fluid pressure so as to balance against external sea pressure thus preventing fairing collapse. Conforming of the array to the outer surface shape maximizes available nearby internal nose volume thus allowing beamforming electronics to be located within the thicker pressure hull cavity in close proximity to the array and to connect thereto via a plurality of short coaxial cables. The increased surface area of the conformal array versus a planar array, permits use of the greatest possible number of array elements for a given nose shape resulting in a wide aperture and hence a narrower beamwidth than is possible with a strictly planar array. This array has the capability of steering the acoustic beam forward, backward, and to the side with little variation in beam sensitivity and when scanning forward along the torpedo axis, this array projects a much larger forward aperture than any planar configuration due to the streamlined hydrodynamic nose shape and the increased number of elements.

Obviously many modifications and variations of the present invention may become apparent in light of the above teachings. For example: the type (short tonpilz vice flexural disc), number and orientation (horizontal vice vertical) of the hydrophone elements may be varied. Also, the conical array segments may may vary depending on desired operating parameters. Other lightweight fillers than syntactic foam may be used to reduce the amount of compensating fluid required. In addition, pressure compensating means other than described may be used to prevent fairing collapse. The fairing and pressure hull may be of materials other than metal such as ceramic or synthetics. The vibration isolation material may be of a depth independent type rather than selected for one operating depth.

In light of the above, it is therefore understood that within the scope of the appended claims, the invention may be practiced otherwise than as specifically described.

We claim:

1. A conformal array comprising:

- a pressure hull, fixedly attached to the forward end of a torpedo midbody, having the general shape of a shell of revolution tapering from a diameter smaller than the diameter of said torpedo midbody to a point thereby forming a preselected shape, and being truncated a preselected distance from the torpedo end thereof to form a smaller diameter end said pressure hull having inner and outer surfaces of revolution;
- a plurality of conformal array means, affixed to and conforming to the shape of the outer surface of said pressure hull, for receiving acoustic pressure signals and converting said pressure signals to proportional electrical signals;
- beamforming means, located within and attached to the smaller end of said pressure hull, for receiving said proportional electrical signals from said array means;
- connecting means, fixedly mounted on the smaller end of said pressure hull and connected to said beamforming means, for transmitting said proportional electrical signals from said array means to said beamforming means;
- a thin and hence acoustically transparent outer fairing, having an identical tapered shell of revolution shape as that of said pressure hull and having a large diameter the same as that of said torpedo midbody, said fairing at the larger end thereof fixedly attaching to said pressure hull forming a conformal cavity therebetween within which said array means are disposed; and
- pressure compensating means attached to said pressure hull within said cavity for equalizing pressure within said cavity with the sea pressure on the outer surface of said fairing.

2. A conformal array according to claim 1 wherein each of said plurality of conformal array means further comprises:

- a plurality of acoustic transducers; and
- baffle means for mounting said plurality of acoustic transducers to form a conformal array and providing vibration isolation therefor.

3. A conformal array according to claim 2 wherein said plurality of acoustic transducers further comprise dual flexural disc hydrophones.

4. A conformal array according to claim 3 wherein said baffle means further comprises:

- a mounting plate having substantially the same shape as said pressure hull;
- a first layer of vibration isolation material having the same shape as said mounting plate being bonded to the underside of said mounting plate; and
- a second layer of vibration isolation material having the same shape as said first layer with a plurality of apertures cut therethrough, said apertures being spaced so as to correspond to the locations of said plurality of acoustic transducers, said second layer being bonded to the top side of said mounting plate.

5. A conformal array according to claim 4 wherein said beamforming means further comprises:

- a preamplifier for receiving said electrical signals from said connecting means and amplifying said electrical signals; and
- a beamformer for receiving amplified electrical signals from said preamplifier and combining said signals to form desired beam patterns.

6. A conformal array according to claim 5 wherein said connecting means further comprises:

a coaxial connector, fixedly attached to the smaller end of said pressure hull, having a plurality of connecting pins passing therethrough; and a plurality of relatively short coaxial cables, one end of each connecting to said plurality of hydrophones and the other end of each connecting to one of said connecting pins in said coaxial connector.

7. A conformal array according to claim 6 wherein said pressure compensating means further comprises:

a plurality of pressure compensators fixedly attached to said pressure hull;

a plurality of pressure lines, having one end thereof attached to said plurality of pressure compensators and the other end thereof attached to an external sea port;

a plurality of volume filler pieces shaped to fill said cavity for occupying unused portions of said cavity;

an acoustic fluid having sound transmission characteristics similar to that of seawater being generally disposed throughout all remaining unfilled voids in said cavity; and an oil filler pipe, fixedly attached to the internal cavity of said pressure hull to permit filling of said cavity with said acoustic fluid.

8. A conformal array according to claim 7 wherein said acoustic fluid further comprises castor oil.

9. A conformal array according to claim 8 wherein said volume filler pieces further comprise syntactic foam.

* * * * *